United States Patent
Boldyrev et al.

(10) Patent No.: US 10,148,709 B2
(45) Date of Patent: Dec. 4, 2018

(54) METHOD AND APPARATUS FOR UPDATING OR VALIDATING A GEOGRAPHIC RECORD BASED ON CROWDSOURCED LOCATION DATA

(75) Inventors: Sergey Boldyrev, Söderkulla (FI); Debmalya Biswas, Lausanne (CH); Juha Kalevi Laurila, St-Legier (CH); Lauri Aarno Olavi Tarkkala, Berlin (DE)

(73) Assignee: HERE Global B.V., Veldhoven (NL)

( * ) Notice: Subject to any disclaimer, the term of this patent is extended or adjusted under 35 U.S.C. 154(b) by 980 days.

(21) Appl. No.: 13/601,614

(22) Filed: Aug. 31, 2012

(65) Prior Publication Data

US 2014/0067938 A1    Mar. 6, 2014

(51) Int. Cl.
| | | |
|---|---|---|
| H04L 29/06 | (2006.01) | |
| H04W 4/029 | (2018.01) | |
| H04W 4/20 | (2018.01) | |
| G01C 21/32 | (2006.01) | |
| G01S 5/02 | (2010.01) | |

(52) U.S. Cl.
CPC ............ *H04L 65/403* (2013.01); *G01C 21/32* (2013.01); *G01S 5/0252* (2013.01); *H04W 4/029* (2018.02); *H04W 4/20* (2013.01)

(58) Field of Classification Search
CPC ....... H04W 4/02; H04W 4/025; H04W 4/028; H04W 4/046
USPC ....................................................... 709/204
See application file for complete search history.

(56) References Cited

U.S. PATENT DOCUMENTS

| | | | |
|---|---|---|---|
| 7,617,542 B2 | 11/2009 | Vataja | |
| 8,320,939 B1* | 11/2012 | Vincent | G01S 19/48 370/338 |
| 8,577,598 B2* | 11/2013 | Singh | 701/410 |
| 8,620,532 B2* | 12/2013 | Curtis et al. | 701/50 |
| 8,812,585 B2* | 8/2014 | Gharpure | G06Q 10/00 709/203 |
| 2007/0073480 A1* | 3/2007 | Singh | G01C 21/3484 701/420 |
| 2008/0294678 A1* | 11/2008 | Gorman | G06F 17/30241 |
| 2009/0319172 A1* | 12/2009 | Almeida | G01C 21/20 701/533 |
| 2010/0023259 A1* | 1/2010 | Krumm | G01C 21/20 701/532 |

(Continued)

FOREIGN PATENT DOCUMENTS

| | | |
|---|---|---|
| WO | WO 2011/159487 A1 | 6/2011 |
| WO | WO 2011/159487 A2 | 12/2011 |

OTHER PUBLICATIONS

Waze GPS App for Android Uses Crowd-Sourcing for Real Time Traffic (Free), Jan. 2012, http://software2tech.com/2012/01/23/waze-gps-app-for-android-uses-crowd-sourcing-for-real-time-traffic-free/.

*Primary Examiner* — Blake J Rubin
(74) *Attorney, Agent, or Firm* — Ditthavong & Steiner, P.C.

(57) ABSTRACT

Methods and apparatuses are provided for validating crowd-sourced location data. A validation platform causes, at least in part, a determination of location data reported by at least one user, at least one device associated with the at least one user, or a combination thereof. The validation platform processes, and/or facilitates a processing of personal detail information associated with the at least one user, the at least one device, or a combination thereof to cause, at least in part, a validation of the location data.

18 Claims, 12 Drawing Sheets

(56) References Cited

U.S. PATENT DOCUMENTS

| | | | |
|---|---|---|---|
| 2010/0152997 A1* | 6/2010 | de Silva | G01C 21/26 701/532 |
| 2010/0198814 A1* | 8/2010 | Petersen | H04W 4/029 707/722 |
| 2010/0262915 A1* | 10/2010 | Bocking | H04W 4/02 715/733 |
| 2011/0131172 A1* | 6/2011 | Herzog | G06Q 10/10 706/58 |
| 2011/0151898 A1* | 6/2011 | Chandra | H04W 4/02 455/466 |
| 2011/0153208 A1* | 6/2011 | Kruglick | G01C 21/20 701/533 |
| 2011/0205125 A1* | 8/2011 | Lin | G01S 5/0236 342/451 |
| 2011/0246148 A1* | 10/2011 | Gupta | H04W 64/00 703/2 |
| 2012/0046860 A1 | 2/2012 | Curtis et al. | |
| 2012/0123667 A1* | 5/2012 | Gueziec | 701/119 |
| 2012/0166788 A1* | 6/2012 | Racha et al. | 713/100 |
| 2012/0271543 A1* | 10/2012 | Boyer | G01C 21/3461 701/416 |
| 2012/0330722 A1* | 12/2012 | Volpe | G06Q 30/0201 705/7.32 |
| 2013/0046738 A1* | 2/2013 | Kuo | G06Q 30/0631 707/690 |
| 2013/0073473 A1* | 3/2013 | Heath | G06Q 30/02 705/319 |
| 2013/0110393 A1* | 5/2013 | Heed | G01C 21/3484 701/430 |
| 2013/0166480 A1* | 6/2013 | Popescu | G06N 99/005 706/12 |
| 2013/0226451 A1* | 8/2013 | O'Neill et al. | 701/450 |
| 2013/0261961 A1* | 10/2013 | Cardoso, Jr. | G01C 21/00 701/467 |
| 2013/0262479 A1* | 10/2013 | Liang | G06F 17/3053 707/748 |
| 2013/0325329 A1* | 12/2013 | Gupta | G01C 21/32 701/450 |
| 2014/0012494 A1* | 1/2014 | Cudak | G01C 21/3415 701/412 |
| 2014/0081572 A1* | 3/2014 | Poornachandran et al. | 701/537 |
| 2014/0088860 A1* | 3/2014 | Poornachandran et al. | 701/410 |

\* cited by examiner

302

300

304

306

310

308

312

310

314

METHOD AND APPARATUS FOR UPDATING OR VALIDATING A GEOGRAPHIC RECORD BASED ON CROWDSOURCED LOCATION DATA

BACKGROUND

Service providers and device manufacturers (e.g., wireless, cellular, etc.) are continually challenged to deliver value and convenience to consumers by, for example, providing compelling network services, such as, offering open source mapping platforms and map creation tools that allow users to add up-to-date data in real time to keep pace with a rapidly evolving landscape and urban environs. One area of interest has been the development of services and technologies for crowdsourced maps, wherein a user is presented with geo-satellite images of an area, on which a user may customize particular map elements by adding or deleting various features. However, the existing methods for customizing updated maps with map information, such as new routes and places of interest, generally are based on time consuming, labor-intensive processes of questionable reliability. Accordingly, service providers and device manufacturers are challenged to develop new mechanisms for effectively and efficiently validating user provided location information to build an accurate and reliable data platform tool.

Some Example Embodiments

Therefore, there is a need for an approach for validating crowdsourced location data.

According to one embodiment, a method comprises determining location data reported by at least one user, at least one device associated with the at least one user, or a combination thereof. The method also comprises processing and/or facilitating a processing of personal detail information associated with the at least one user, the at least one device, or a combination thereof to cause, at least in part, a validation of the location data.

According to another embodiment, an apparatus comprises at least one processor, and at least one memory including computer program code for one or more computer programs, the at least one memory and the computer program code configured to, with the at least one processor, cause, at least in part, the apparatus to determining location data reported by at least one user, at least one device associated with the at least one user, or a combination thereof. The apparatus is also caused to process and/or facilitate a processing of personal detail information associated with the at least one user, the at least one device, or a combination thereof to cause, at least in part, a validation of the location data.

According to another embodiment, a computer-readable storage medium carries one or more sequences of one or more instructions which, when executed by one or more processors, cause, at least in part, an apparatus to determine location data reported by at least one user, at least one device associated with the at least one user, or a combination thereof. The apparatus is also caused to process and/or facilitate a processing of personal detail information associated with the at least one user, the at least one device, or a combination thereof to cause, at least in part, a validation of the location data.

According to another embodiment, an apparatus comprises means for determining location data reported by at least one user, at least one device associated with the at least one user, or a combination thereof. The apparatus also comprises means for processing and/or facilitating a processing of personal detail information associated with the at least one user, the at least one device, or a combination thereof to cause, at least in part, a validation of the location data.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for validating crowdsourced location data are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
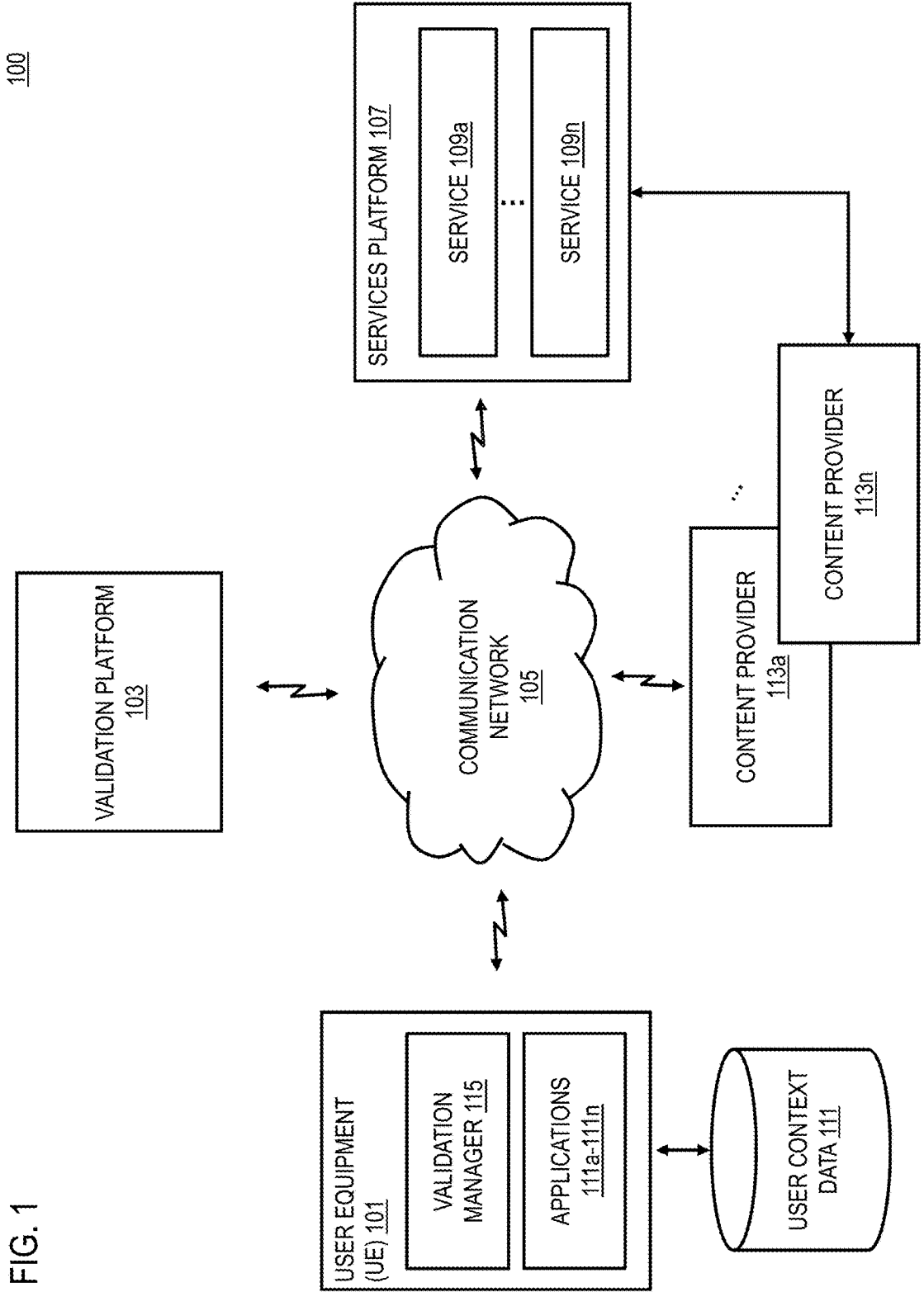
FIG. 1 is a diagram of a system capable of validating crowdsourced location data, according to one embodiment.

FIG. 1 is a diagram of a system capable of validating crowdsourced location data, according to one embodiment. As discussed above, maps utilized by any of a number of navigation tools are often out of date and updating such maps may prove cumbersome with less than reliable results. Some traditional approaches have allowed users to make updates to map information manually and then share such updates with users and/or user communities. Such updates may not be accurate or reliable and may conflict with updates provided by other users. The accuracy of such location data updates is dependent upon the reliability of the source. However, such platforms may not be capable of source validation, or even source identification, to allow for any measure of reliability.

To address this problem, a system 100 of FIG. 1 introduces the capability to validate crowdsourced information (e.g., location data) across a variety of use cases and applications by maximizing data offerings by reliable sources and minimizing errant map augmentation. The system 100 introduces an approach for integrated crowdsourced map creation that allows for efficient validation by combining user personal detail information and location data for validation. The system 100 achieves such goals while preserving user privacy at no cost to reliability. In one embodiment, the system 100 preserves the privacy of the personal detail information used for validation by causing the validation to be performed on the device that contains the personal detail information. In this way, the system 100 need not expose the personal detail information to components outside of the device to ensure privacy. In other words, by performing the validation on the device, the system 100 can expose the results of the validation to other components outside of the device without exposing the underlying personal detail information. In some embodiments, depending on the privacy policy associated with the personal detail information, all or a portion of the personal detail information may be processed by a trusted server outside of the server.

In another embodiment, the device and the trusted server may cooperatively perform the validation, whereby the device performs the validation based on personal detail information accessible to the device, and the trusted server performs the validation on the personal detail information the server has access to. The results of the one device and trusted server validations may then be aggregated to determine an overall validation of the crowdsourced information.

As shown in FIG. 1, the system 100 comprises a user equipment (UE) 101 configured with a validation manager 115 for validating crowdsourced information using personal detail information stored in the UE 101. In addition or alternatively, the UE 101 has connectivity to a validation platform 103 via a communication network 105 for performing all or a portion of the validation of the crowdsourced information. By way of example, the communication network 105 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, an in-vehicle infotainment system, or any combination thereof, including the accessories and peripherals of these devices, or any combination thereof. It is also contemplated that the UE 101 can support any type of interface to the user (such as "wearable" circuitry, etc.).

In one embodiment, user personal detail information enables effective validation of crowdsourced location updates. User identification allows for reliability assessment of current updates based, at least in part, on a user's history of reporting reliable data. Beyond a record of all user updates and associated information, location data and contextual history associated with a user further enables validation of location updates. For instance, an update of a particular location or map feature in a particular neighborhood derived from a user having personal information listing said neighborhood, as for example, "home neighborhood", may be evaluated as more reliable than an update from a user having no personal association or location travel history with said neighborhood. Further, location history, e.g., GPS traces, may be accounted for in validation. For example, if data has been collected indicating that a user has actually traveled on an updated road (e.g., a new route or detour), a validation finding may reflect an increased likelihood that the update is accurate, thus enhancing the reliability of the particular update and the reliability of the user generally. Such reliability assessments may be accessible to other users in a community or validation platform and may influence reliability validation of future updates. Combined with personal detail information, group characteristics determined according to known user connections can also be used to assess the reliability of particular users, user groups, reported data, updates, or a combination thereof. For instance, if a user is associated via any possible connection to one or more other users in any way or is referred to such a validation platform by a reliable contributor, then an accounting of such contacts may be assessed to determine a user's reliability.

In one embodiment, route based navigation is utilized to determine a GPS trace. As such, if the user takes a detour on a route that is currently not identified as a road, then the GPS trace can be recorded and presented to the user as a newly identified road upon journey completion. The presentation of newly identified GPS traces need not be restricted to any device, application, or methodology—such data can be stored offline (possibly encrypted), synced directly between devices or via an intermediate cloud server, then presented to a user for additional inputs and processing via validation platform 103. Such an input methodology may have significant advantages over a manual, non-passive approach. In some embodiments, user input mechanism is reduced to simply clicking a button, or a like trigger, as compared to drawing complex lines on a computer (e.g. for curved roads). Further, a GPS trace allows capturing the updated road details with enhanced fidelity. As for validation purposes, captured data indicating that a user has actually driven on the reported (new) route is a strong validation indicator that such a road actually exists. Further, it is possible to detect such essential detours real-time in a reliable manner, wherein a user may not be required nor have an opportunity to manipulate route traces in order to offer such an update.

In some embodiments, automated approaches can be applied to both editing and deleting map content. A validation platform may determine that a user repeatedly avoids a road (takes a detour), then that road can be presented to a user as a candidate for deletion. The road may also be a candidate for editing properties (e.g. currently some temporary construction is going on the road—so set a construction property of the road). The main difference between automated detection of new roads in comparison to editing/deleting existing roads is that while new roads (to be added) can be detected accurately based on a single detour by the user, the recommendation to delete/edit roads is based on information collected over multiple detours, ensuring the detection period will be longer.

In some embodiments, personal detail information may be assessed for validation. For example, if a user's personal detail information indicates that the user has a verified address (e.g., home address, work address) that is in the vicinity of a user reported location then the reliability of that location data may increase commensurately. In a further embodiment, the neighborhood of a user may also be determined dynamically. As such, if location data information reported by a user is determined accurate, then a user's personal detail information may reflect an enhanced reliability for updates by this user in a particular geographic location. In this case, for example, future reported updates by this user in this particular geographic location may render enhanced reliability. As such, validation platform 103 is, in a sense, enhancing its validation ability by building a location history based on detected information, updates, and personal detail information. Further, user associated social networking information, including event specific information, may be assessed by validation platform 103 to determine reliability. In such an example, social networking information indicating that User A was at an office party in location 1 at time t combined with the information that User B is a colleague of A—can be used to infer that User B was also at location 1 in time t. Such verifiable information may be heavily weighted by validation platform for reliability processing.

In some embodiments, there is a direct correlation between reliability and the amount of accessible personal detail information. However, it is clear that provisions must be made to ensure user privacy—individual privacy as well as group specific privacy. As such, privacy safeguards may be integrated with the validation platform 103 to protect user privacy while allowing access to user personal information as explicitly allowed by the user. As such, privacy measures may allow a user to control information sharing and/or data aggregation. In some embodiments, users may at least be notified, or even required, to grant access to GPS traces in order to record a travel route and history. In an exemplary real-time usage scenario, only the current route taken by the user may be recorded. As such, any detected detours may be presented to the user for use allowance. Depending on the user input, detour and/or route information may either be reported to a crowdsourced map server (possibly anonymously) or go unreported at the discretion of a user. Such a methodology may be employed in an offline system, in which any detours are saved and presented to the user at a later point in time. In some embodiments, a user may be notified of route logging. In such a case, a user may be informed that any collected information will only be used locally and not shared/aggregated with other information for mining purposes. In some embodiments, a user may be provided with UI/UX that allows for selection and deletion of stored routes as required. In some embodiments, only routes explicitly authorized by users are offered as a location data update.

The UE 101 may execute one or more applications 111a-111n (collectively referred to as applications 111). The applications 111 may be any type of application, such as one or more social networking applications, one or more navigational applications, one or more organizational applications, one or more browsing applications (e.g., Internet browser), one or more sensor applications, etc., or a combination thereof. In one embodiment, one or more applications 111 may perform any one or more of the functions of the validation platform 103 discussed below.

The system 100 may also include a services platform 107 that includes one or more services 109a-109n (collectively referred to as services 109). The services 109 may be any type of service, such as one or more social networking services, one or more navigational services, one or more organizational services, one or more sensor services, etc., or a combination thereof. In one embodiment, one or more services 109 may perform any one or more of the functions of the validation platform 103. In one embodiment, the validation platform 103 may provide information pertaining to personal detail information, and/or reliability information, and/or reference contextual information via user context data 111 to one or more of the services 109 so that the services 109 may provide personalized services associated with the validated location data to the user.

The system 100 may also include one or more content providers 113a-113n (collectively referred to as content providers 113). The content providers 113 may provide any type of content, such as content related to social networking services, one or more navigational services, one or more organizational services, one or more sensor services, etc., or a combination thereof. In one embodiment, the validation platform 103 may provide information pertaining to personal detail information, and/or reliability information, and/or reference contextual information via user context data 111 to one or more of the content providers 113 so that the content providers 113 may provide personalized services associated with the validated location data to the user.

The system 100 may also include user context data 111. The user context data may include user events, user content items, location-based context data (e.g., time stamps, etc.). For example, the context data contains environment data, weather data, traffic data, event data, commuter data, etc. As an example, the user contextual data of a user interested in technology or gadgets may be associated with electronics stores, wireless hot spots in the city, computer conventions, forums of technologies, science museums, media laboratories, etc. Services platform 107 may collect, assemble, store, update, and/or supply the context data and user context data. In one embodiment, user context data, such as, but not limited to user events may be extracted from calendars, emails, voice messages, text messages, blogs, bulletin boards, discussion forums, geographic information systems, and social network websites. In another embodiment, user content items may be used to infer context data and may be retrieved from, for instance, personal photo albums, media libraries, playlists, etc. In one embodiment, a validation platform 103 processes the context data and user context data of different formats and types including data derived from various forms of communication such as emails, text messages, voice messages, calls, video/audio clips, etc.

By way of example, the UE 101, validation platform 103, validation manager 115, services platform 107, user context data, 111, and content provider 113 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

In one embodiment, the validation manager 115 and the validation platform 103 can interact according to a client-server model, for example. In one embodiment, the client-server relationship between the validation manager 115 and the validation platform 103 can depend on the privacy policies associated with the personal detail information used for validation. For example, if the privacy policy states that personal detail information is not be exposed outside of the UE 101, then the validation manager 115 may perform all of the validation process. In one embodiment, if the validation is based on verifying crowd-sourced information against UE 101 sensor data (e.g., location sensor data), the validation manager 115 may perform validation on device so that it can access the sensor data.

It is noted that the client-server model of computer process interaction is widely known and used. According to the client-server model, a client process sends a message including a request to a server process, and the server process responds by providing a service. The server process can also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
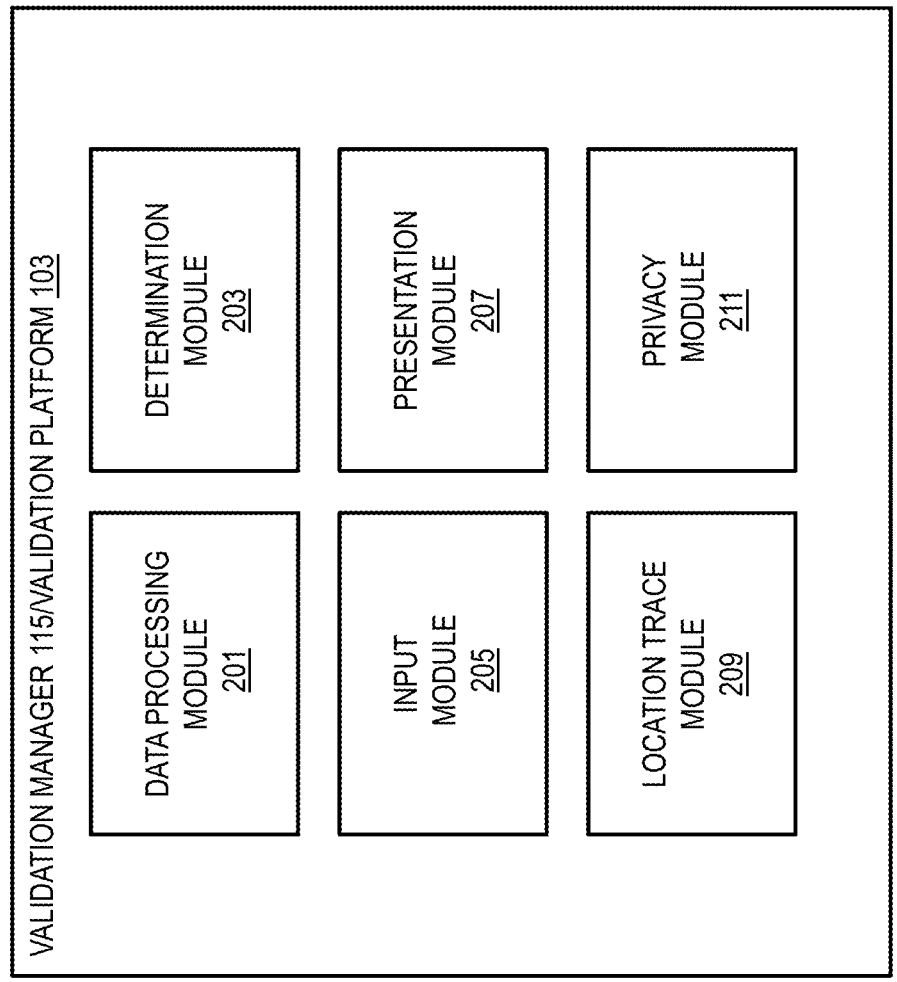
FIG. 2 is a diagram of the components of validation platform, according to one embodiment.
Figure 3B:
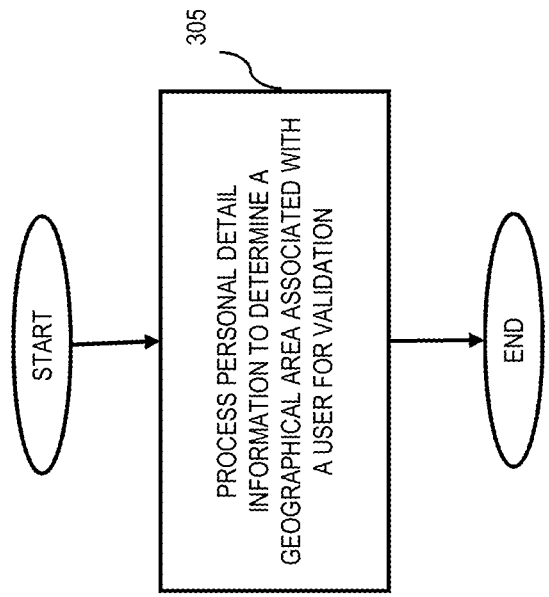
FIGS. 3A-3I are flowcharts of a process for validating crowdsourced location data, according to one embodiment.
Figure 3A:
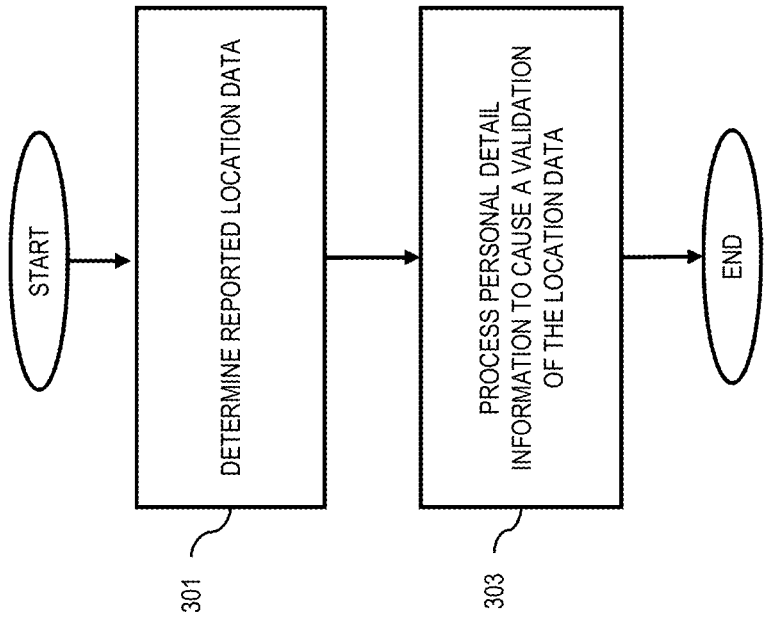
Figure 3C:
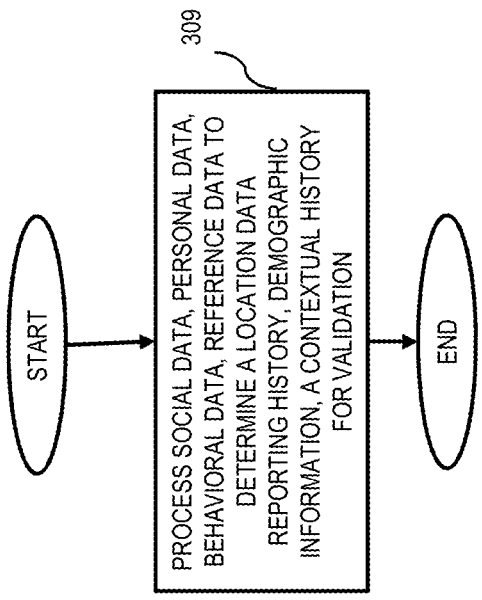
Figure 3D:
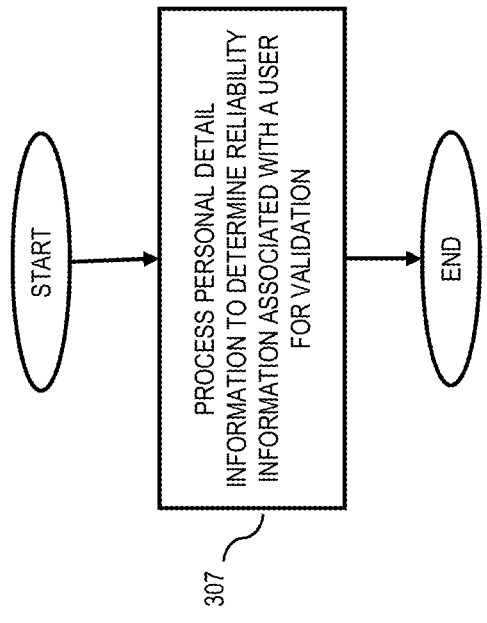
Figure 3F:
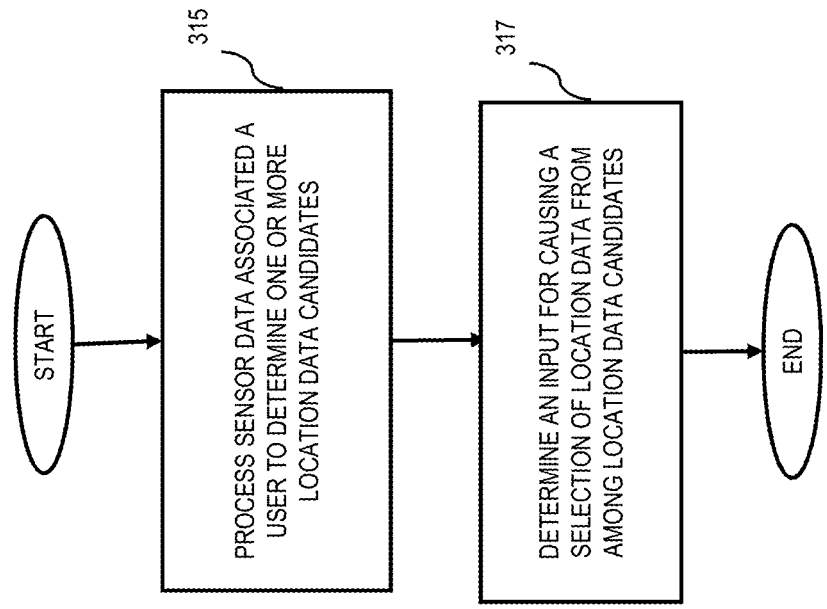
Figure 3E:
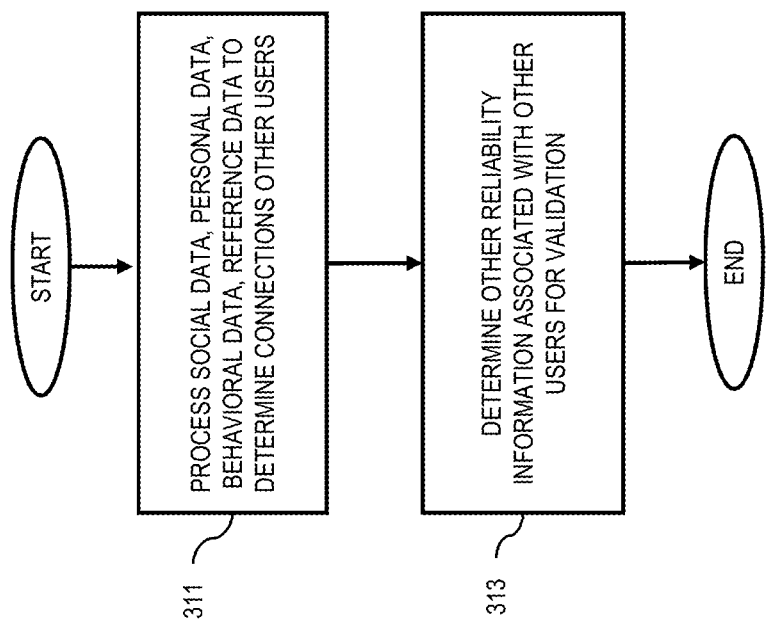
Figure 3H:
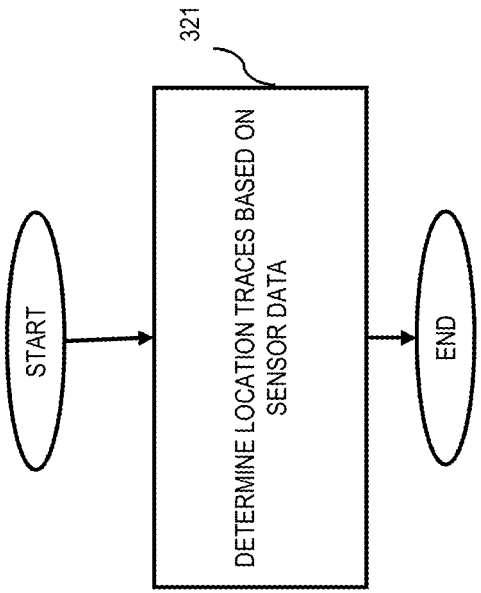
Figure 3G:
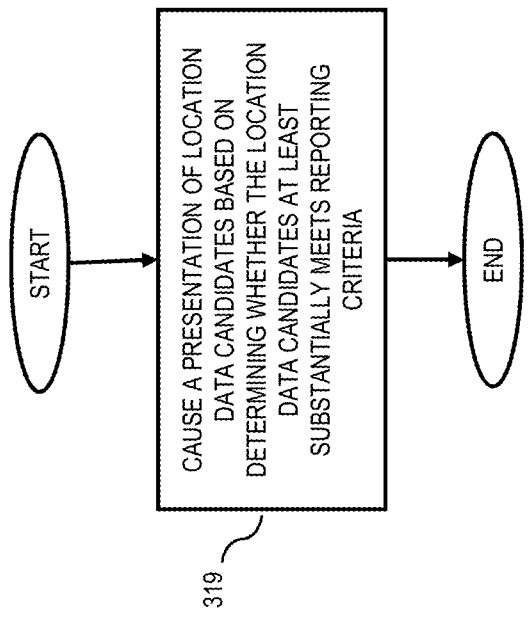
Figure 3I:
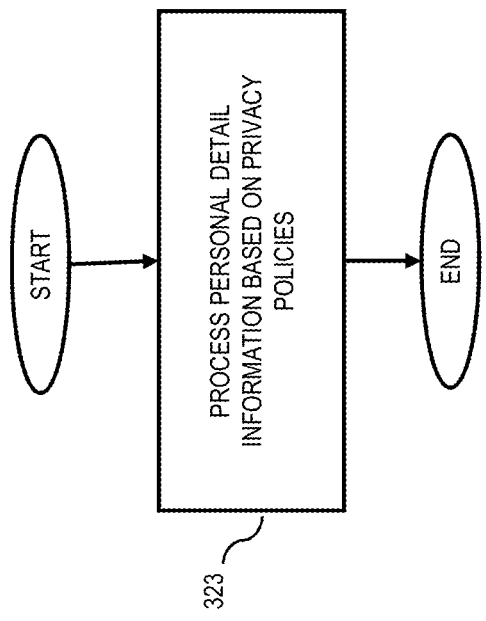

FIG. 2 is a diagram of the components of validation manager 115/validation platform 103, according to one embodiment. By way of example, the validation manager 115 and/or the validation platform 103 includes one or more components for validating crowdsourced location data. For example, the validation manager 115 performs the validation on the UE 101 without exposing personal detail information outside of the UE 101, whereas the validation platform 103 is a network side component (e.g., a trusted server) that can perform the same functions (e.g., if permitted privacy policies—if any—associated with the personal detail information). It is contemplated that the functions of these components may be combined in one or more components or performed by other components of equivalent functionality. In this embodiment, the validation platform 103 includes a data processing module 201, determination module 203, input module 205, presentation module 207, location trace module 209, and privacy module 211.

The data processing module 201 interfaces with validation manager 115/validation platform 103 to process and/or facilitate a processing of personal detail information associated with the at least one user, the at least one device, or a combination thereof for validation of the location data. Such data may be employed to generate and process a user's reporting history to determine at least one geographical area associated with the at least one user, the at least one device, or a combination thereof. In some embodiments, personal detail information is processed to determine reliability information associated with the at least one user, the at least one device, or a combination thereof. As such, data processing module 201 functions in part to facilitate a processing of social data, personal data, behavioral data, reference data, or a combination thereof to determine a location data reporting history, demographic information, a contextual history, or a combination thereof. In some embodiments, such processing is utilized to determine one or more connections with one or more other users. In a further embodiment, a processing of sensor data associated with the at least one user, the at least one device, or a combination thereof via determination module 203 is employed to determine one or more location data candidates.

The determination module 203 interfaces with at least the data processing module 201 to facilitate a determination of reported location data to determine reliability information associated with a user. In some embodiments, determination module 203 functions to determine other reliability information associated with the one or more other users. As such, validation may be based, at least in part, on the one or more connections, the reliability information, or a combination thereof. In a further embodiment, determination module 203 functions coordinately with input module 205 via a user input for causing, at least in part, a selection of the location data from among the one or more location data candidates. Further, determination module 203 determines one or more location traces via location trace module 209 based, at least in part, on sensor data.

The input module 205 interfaces with the validation manager 115/validation platform 103 for causing, at least in part, a selection of the location data from among the one or more location data candidates. In some embodiments, user input is limited or not required for automatic or predefined location data updates.

The presentation module 207 interfaces with validation manager 115/validation platform 103 to cause, at least in part, a presentation of the one or more location data candidates based, at least in part, on determining whether the one or more location data candidates at least substantially meets one or more reporting criteria. In some embodiments, presentation module 207 presents information for user input via a user interface. In one embodiment, selection of the location data is from among the presented one or more location data candidates.

The location trace module 209 interfaces with determination module 203 and validation manager 115/validation platform 103 to determine one or more location traces via location trace module 209. Such location traces may be based, at least in part, on sensor data. In some embodiments, location trace module 209 functions to facilitate dynamic user location determination via at least one GPS sensor, wherein a GPS location trace may be recorded and stored for validation and crowdsourcing. In some embodiments, location data, one or more location data candidates, or a combination thereof are based, at least in part, on the one or more location traces.

The privacy module 211 interfaces with validation platform 103 to ensure that despite collection of user data, the user may configure privacy settings to protect the personal detail information utilized in validation processes.

Figure 7:
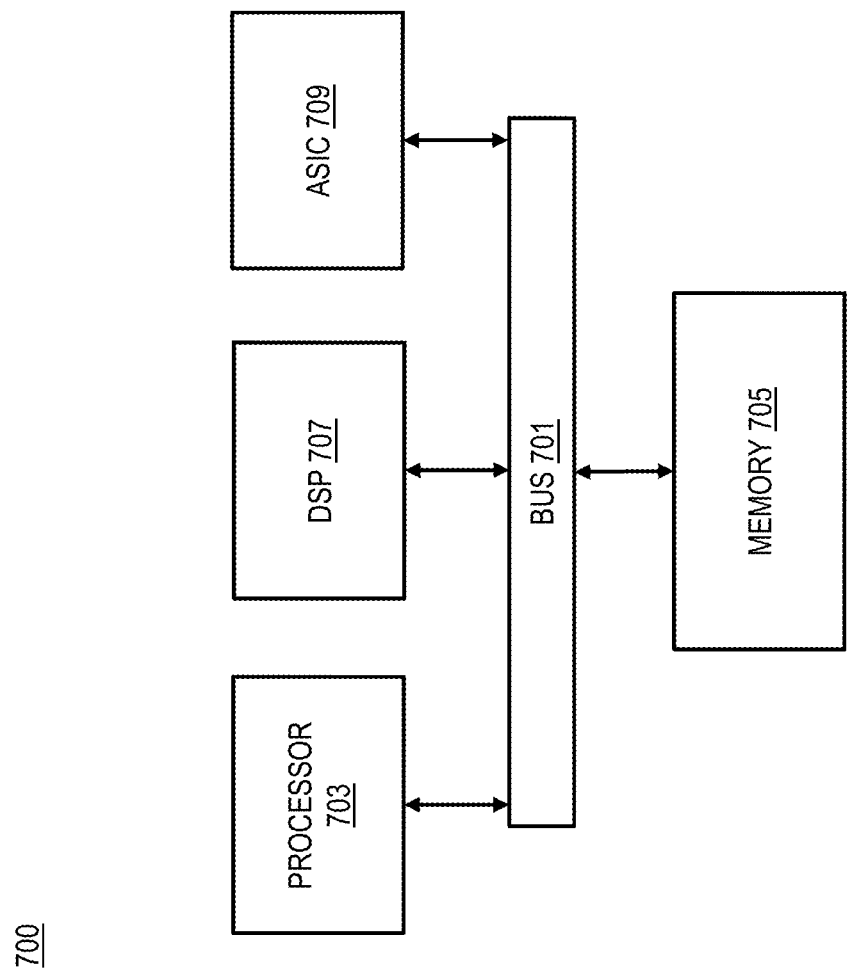
FIG. 7 is a diagram of a chip set that can be used to implement an embodiment of the invention.

FIG. 3 is a flowchart of a process for validating crowdsourced location data, according to one embodiment. In one embodiment, the validation manager 115/validation platform 103 performs the process 300 and is implemented in, for instance, a chip set including a processor and a memory as shown in FIG. 7.

In step 301, determination module 203 functions coordinately with at least the data processing module 201 to facilitate a determination of location data reported by at least one user, at least one device associated with the at least one user, or a combination thereof. In some embodiments location data may include any type of mapping and/or location information. In some embodiments, such information may include pre-existing roads, new roads, detours, routes or a combination thereof. In further embodiments, location data may not be limited to points of interest (POIs) but my also further include road characteristics, road conditions, location coordinates, properties, bridges, and location identifiers (e.g., home, workplace, school, etc.).

In step 303, data processing module 201 functions coordinately with at least elements of the validation manager 115/validation platform 103 to process and/or facilitate a processing of personal detail information associated with the at least one user, the at least one device, or a combination thereof to cause, at least in part, via the validation manager 115/validation platform 103, validation of the location data. In some embodiments, personal detail information may include, but is not limited to, any information that may function as a unique user identifier, including all associated personal information. Such information may be employed in validation, in that, in some embodiments, data reliability may be evaluated and measured, in part, by data processing module 201 employed to generate and process a user's reporting history. In some embodiments, personal detail information may include occupation information, personal location information, and group connection information. In a further embodiment, personal detail information may also include location data user update preferences.

In step 305, data processing module 201 functions coordinately with the validation manager 115/validation platform 103 to process and/or facilitate a processing of the personal detail information to determine at least one geographical area associated with the at least one user, the at least one device, or a combination thereof. In some embodiments, geographical area may include information pertaining to location coordinates, and may further include various metadata including geographical identifiers sourced from network components, such as, but not limited to services platform 107, content provider 113, etc. Such identifiers may be user created or user specific (e.g., home, workplace, neighborhood, etc.). In some embodiments, validation may be based, at least in part, on whether the location data is within or proximate to the at least one geographical area.

In step 307, data processing module 201 functions to process and/or facilitate a processing of the personal detail information to function coordinately with determination module 203 to determine reliability information associated with the at least one user, the at least one device, or a combination thereof. In some embodiments, validation may be based, at least in part, on such reliability information. As such, reliability may include an evaluation of previous user data offerings. Information relating to such a reporting history may be part of a user's personal detail information accessible via validation manager 115/validation platform 103. In some embodiments, personal detail information may include, at least in part, social data, personal data, behavioral data, reference data, or a combination thereof.

In step 309, data processing module 201 functions to process and/or facilitate a processing of social data, personal data, behavioral data, reference data, or a combination thereof to determine a location data reporting history, demographic information, a contextual history, or a combination thereof. In some embodiments, social data may include, but is not limited to, any information pertaining to a user's connectivity to one or more other users. In some embodiments, behavioral data may include, but is not limited to, any information pertaining to the aggregate of a user's responses, actions, reactions, and/or functions. In some embodiments, reference data may include, but is not limited to, any information pertaining to a user's connectivity, personal information, and/or contextual information. In some embodiments, contextual history may include, but is not limited to, any information pertaining to a user's detected and/or provided location and or geographic activity. In some embodiments, validation may be based, at least in part, on the location data reporting history, the demographic information, the contextual history, or a combination thereof.

In step 311, data processing module 201 functions to process and/or facilitate a processing of the social data, the personal data, the behavioral data, the reference data, or a combination thereof to determine one or more connections with one or more other users. Connections may include, but are not limited to, any possible link or association between one or more other users.

In step 313, determination module 203 functions coordinately with validation platform 103 to determine other reliability information associated with the one or more other users. In some embodiments, validation may be based, at least in part, on the one or more connections, the reliability information, or a combination thereof. In some embodiments, the reliability of one or more connections to a user may be considered as a parameter when determining the reliability of a user.

In step 315, data processing module 201 processes and/or facilitates a processing of sensor data associated with the at least one user, the at least one device, or a combination thereof to determine one or more location data candidates. In one embodiment, sensor data may derive from various data recognition techniques for analyzing captured data such as, but not limited to, images. This includes, for example, object recognition. Any known and still developing protocols and algorithms may be employed. If other types of captured data (e.g., sound) are to be processed, one or more devices can be configured with the appropriate sensors (e.g., a microphone) and/or applications. In such embodiments, the application may be a dedicated application operable by one or more devices, a browser based application, or the like. Also, the image capture application may enable the review of newly captured images as well as stored images captured in the past. Any means through which the user can review, acquire, or recall images are within scope of the exemplary embodiments herein. In another example, one or more devices may process contextual sensor information (e.g., accelerometer data, compass data, gyroscope data, GPS data, etc.) to determine a direction or mode of dynamic subject movement, line-of-sight, or a combination thereof.

In step 317, determination module 203 functions to determine an input via input module 205 for causing, at least in part, a selection of the location data from among the one or more location data candidates. In some embodiments, user input is limited or not required for automatic or predefined location data updates.

In step 319, presentation module 207 causes, at least in part, a presentation of the one or more location data candidates based, at least in part, on determining whether the one or more location data candidates at least substantially meets one or more reporting criteria. In some embodiments, presentation module 207 presents information for user input via a user interface. In one embodiment, selection of the location data is from among the presented one or more location data candidates. In some embodiments, reporting criteria may be defined, in part, according to validation parameters. Reporting criteria may be refined as system 100 for validating crowdsourced location data evaluates user updates and reliability. In a further embodiment, user behavior and/or location information may be extracted from user location history, defined in part by one or more location travel traces derived via available sensors.

In step 321, determination module 203 functions coordinately with validation platform 103 to determine one or more location traces via location trace module 209 based, at least in part, on sensor data. In some embodiments, location trace module 209 functions to facilitate dynamic user location determination via at least one GPS sensor, wherein a GPS location trace may be recorded and stored for validation and crowdsourcing. In some embodiments, location data, one or more location data candidates, or a combination thereof are based, at least in part, on the one or more location traces.

In step 323, determination module 203 determines to cause, at least in part, an initiation of the processing of the personal detail information of the at least one device, at least one server, or a combination thereof based, at least in part, on one or more privacy policies according to privacy module 211.

Figure 4:
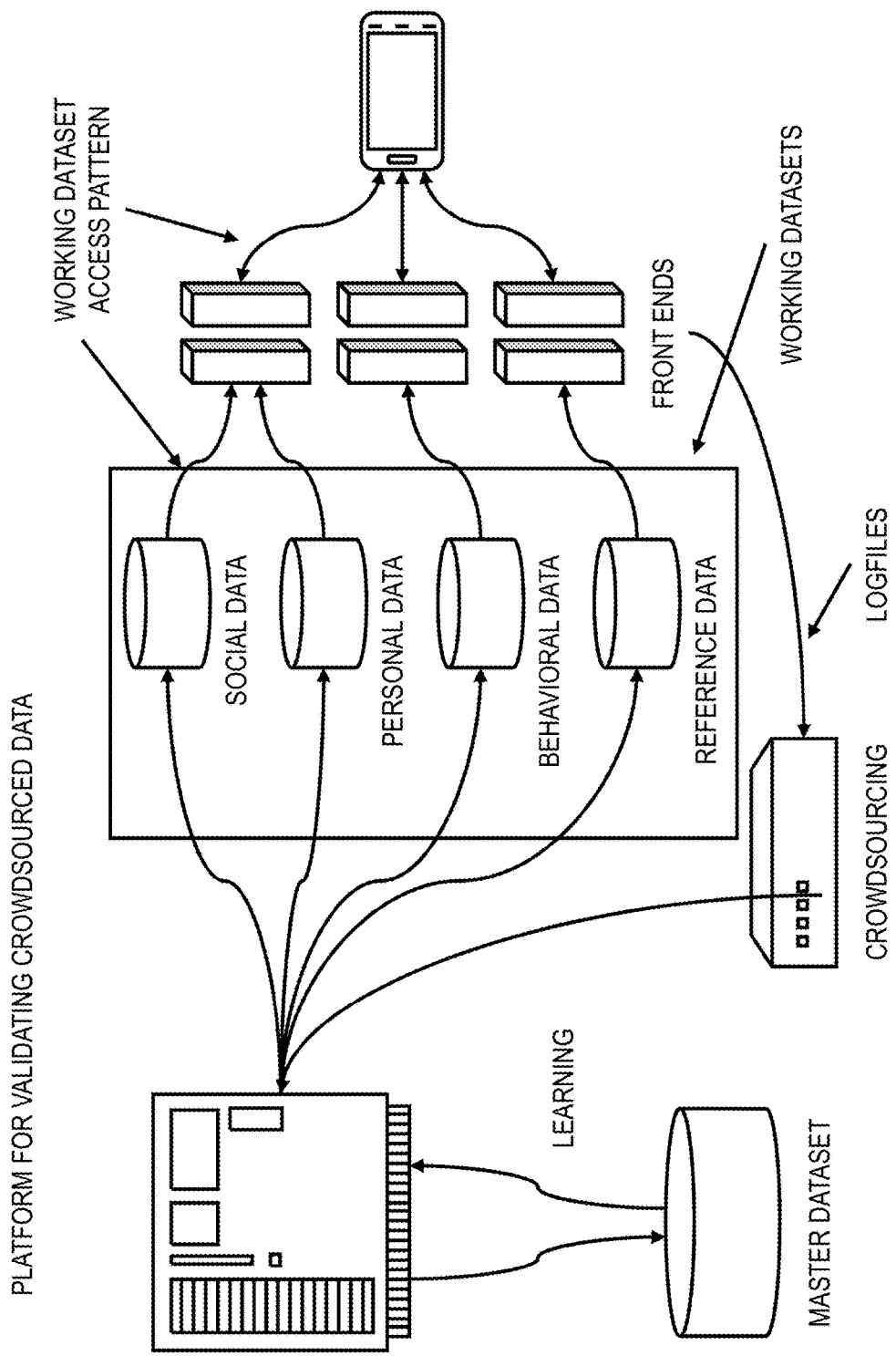
FIG. 4 is diagram of a platform schematic for validating crowdsourced location data, according to various embodiments.

FIG. 4 is a diagram of a platform schematic for validating crowdsourced location data utilized in the processes of FIG. 3, according to various embodiments. The illustrated schematic depicts an embodiment of a distributed network of individuals. Specifically, map update tasks may essentially be outsourced to a distributed group of users. As discussed above, in some embodiments, social data may include, but is not limited to, any information pertaining to a user's connectivity to one or more other users. In some embodiments, behavioral data may include, but is not limited to, any information pertaining to the aggregate of a user's responses, actions, reactions, and/or functions. In some embodiments, reference data may include, but is not limited to, any information pertaining to a user's connectivity, personal information, and/or contextual information. In some embodiments, personal data may include, but is not limited to, any information pertaining to a user's identity and validation platform actions. In some embodiments, validation may be based, at least in part, on the location data reporting history, the demographic information, the contextual history, or a combination thereof. As illustrated in FIG. 4, representative information is aggregated and mined to provide for validated crowdsourced data. In some embodiments, crowdsourced information may be processed to determine reliability for the creation and maintenance of a validated master dataset for utilization by a community of users. In a further embodiment, each user may be incentivized and/or rewarded for reliable contributions. Such motivation may be accounted for as part of a user's personal detail information and may contribute to update reliability and ultimate validation.

Figure 5:
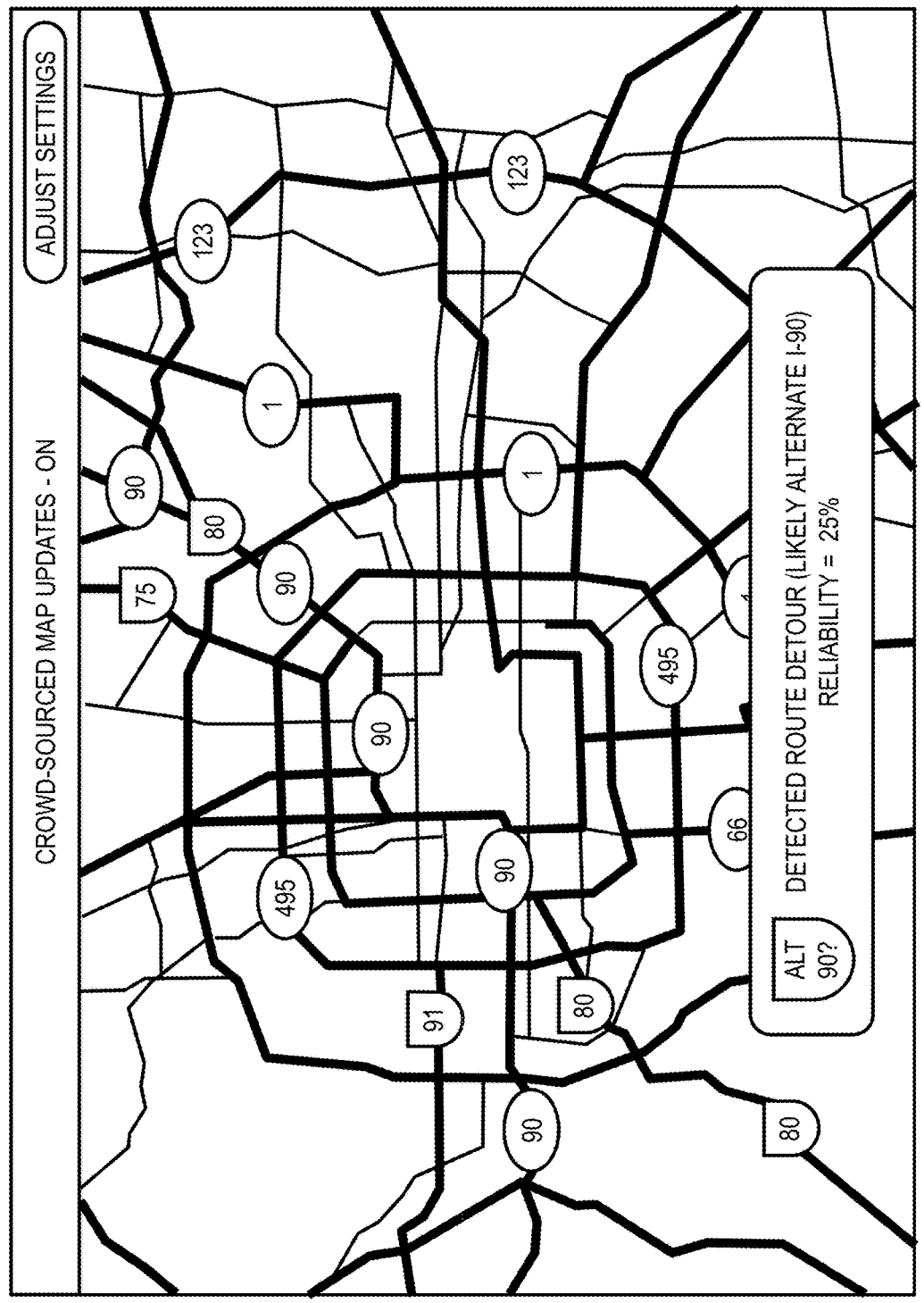
FIG. 5 is a diagram of user interface utilized in the processes of FIG. 3, according to various embodiments.

FIG. 5 is a diagram of user interface utilized in the processes of FIG. 3, according to various embodiments. In one embodiment, detected detour routes may be presented to one or more crowdsourcing platform users via a user interface. A new route detour may be presented to a user according to an updated travel route. In some embodiments, such updates may be provided with the associated reliability information. Route detours may be detected and updated dynamically as a user diverges from a current or pre-existing route. Such detour divergences may be compared to location history and/or available GPS traces for validation processing via the validation manager 115/validation platform 103.

The processes described herein for validating crowdsourced location data may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
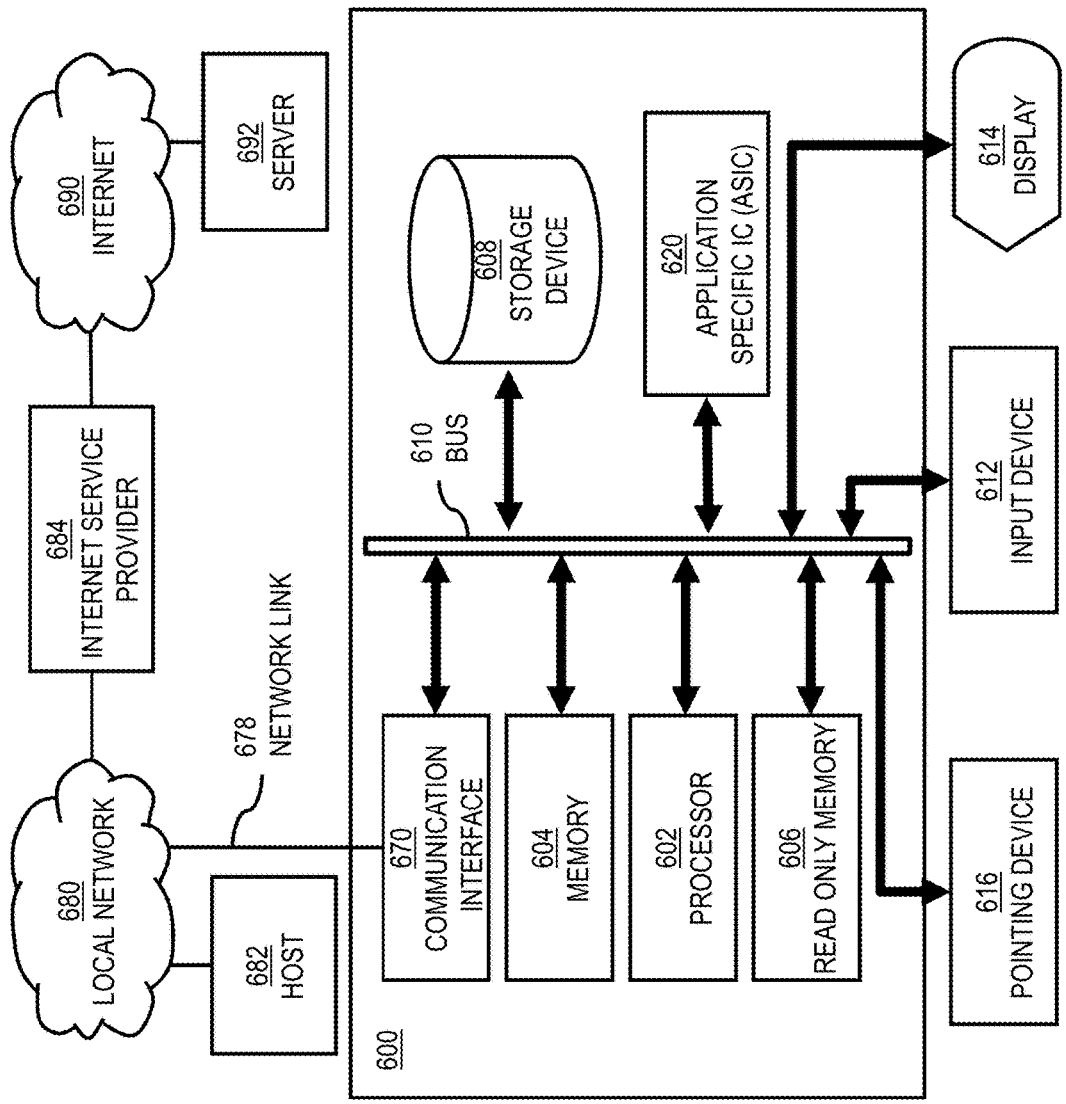
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to validating crowdsourced location data as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of validating crowdsourced location data.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to validating crowdsourced location data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for validating crowdsourced location data. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for validating crowdsourced location data, is provided to the bus 610 for use by the processor from an external input device 612, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for validating crowdsourced location data to the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to validating crowdsourced location data as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of validating crowdsourced location data.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to validating crowdsourced location data. The memory 705 also stores the data associated with or generated by the execution of the inventive steps.

Figure 8:
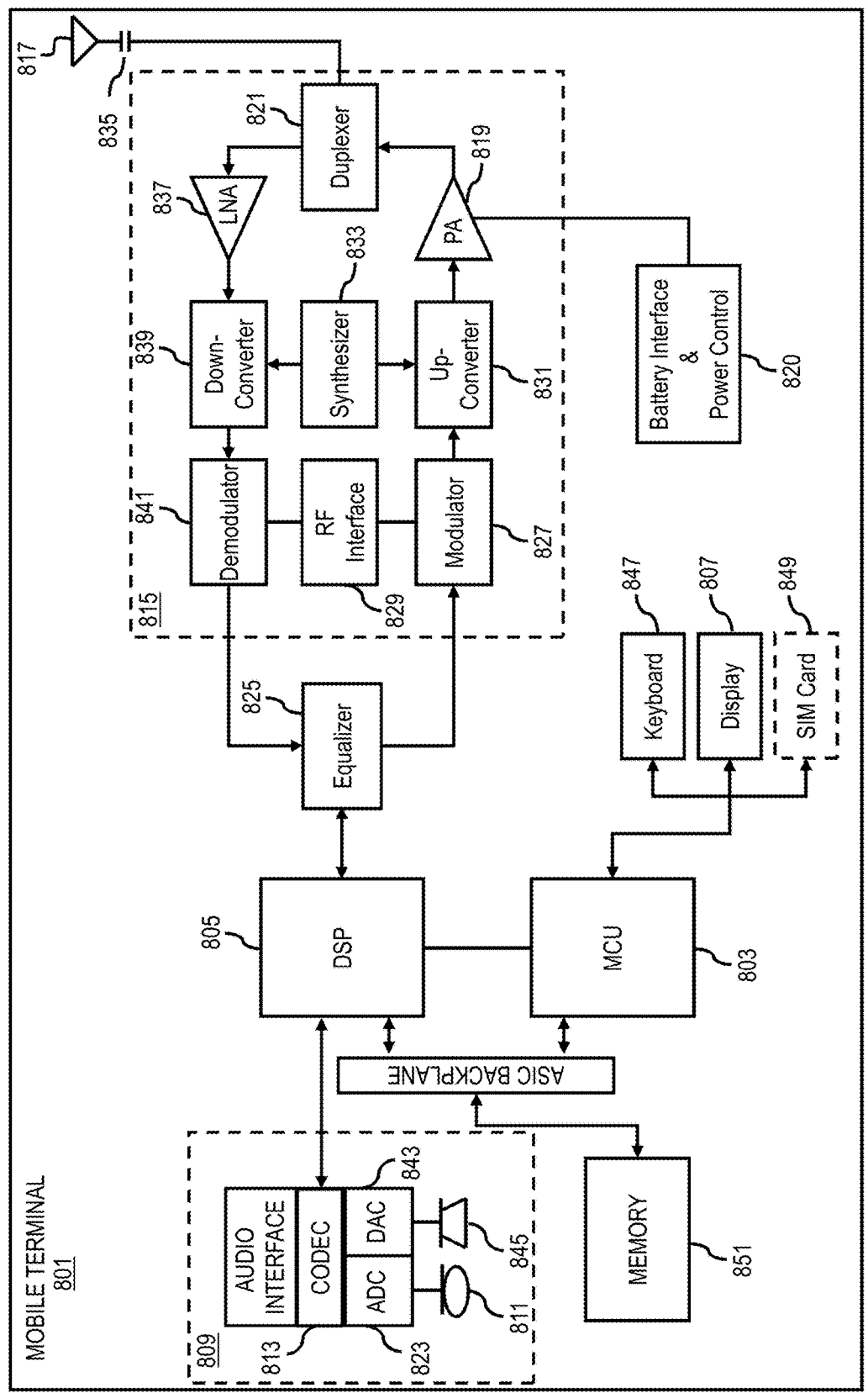
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of validating crowdsourced location data. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of validating crowdsourced location data. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811.

The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to validating crowdsourced location data. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method for validating or updating a geographic record based on crowdsourced location data, the method comprising:

determining personal detail information associated with respective users of a plurality of users, a plurality of devices associated with the respective users of the plurality of users or a combination thereof, wherein the determined personal detail information includes user information about the respective users' home locations or neighborhoods and excludes information regarding the respective users' travel history;

determining location data associated with a geographic region and further associated with the respective users of the plurality of users, the plurality of devices associated with the respective users of the plurality of users or a combination thereof, wherein the determined location data includes information about the respective users' travel histories;

processing, utilizing at least one processor, determined first user personal detail information and determined first user location data associated with a first user of the plurality of users, a device associated with the first user or a combination thereof and generating first user reliability information associated with the first user location data for at least a portion of the geographic region, wherein the first user reliability information is generated based on one or more associations, determined by the processing, between the determined first user personal detail information and the determined first user location data;

processing determined second user personal detail information and determined second user location data associated with a second user of the plurality of users, a device associated with the second user or a combination thereof and generating second user reliability information associated with the second user location data for the at least the portion of the geographic region, wherein the second user reliability information is generated based on one or more determined associations, determined by the processing, between the determined second user personal detail information and the determined second user location data;

comparing, for the at least the portion of the geographic region, the first user reliability information and the second user reliability information;

selecting location data for the at least the portion of the geographic region based on the comparing; and validating or updating a record of the at least the portion of the geographic region based on the selected respective location data.

2. A method of claim 1, further comprising:
processing the personal detail information to determine at least one geographical area associated with at least one of the respective users of the plurality of users, at least one device associated with the at least one of the respective users or a combination thereof.

3. A method of claim 1, further comprising:
processing the personal detail information to determine privacy information associated with at least one of the respective users of the plurality of users, at least one device associated with the at least one of the respective users or a combination thereof.

4. A method of claim 1, wherein the personal detail information includes, at least in part, location data, history data, social data, personal data, behavioral data, reference data, or a combination thereof.

5. A method of claim 4, further comprising:
processing the location data, history data, social data, the personal data, the behavioral data, the reference data, or a combination thereof to determine a location data reporting history, demographic information, a contextual history, or a combination thereof.

6. A method of claim 4, further comprising:
processing the location data, history data, social data, the personal data, the behavioral data, the reference data, or a combination thereof to determine one or more social connections between a user and one or more other users of the plurality of users.

7. A method of claim 1, further comprising:
processing sensor data associated with a user, a user device, or a combination thereof to determine one or more location data candidates; and receiving the sensor data as the location data associated with the geographic region from among the one or more location data candidates.

8. A method of claim 7, further comprising:
initiating a presentation of the one or more location data candidates based, at least in part, on determining whether the one or more location data candidates at least substantially meets one or more reporting criteria, wherein the user selection of the location data is from among the presented one or more location data candidates.

9. A method of claim 7, further comprising:
determining one or more location traces based, at least in part, on the sensor data, wherein the location data, the one or more location data candidates, or a combination thereof are based, at least in part, on the one or more location traces.

10. An apparatus for validating or updating a geographic record based on crowdsourced location data, the apparatus comprising:

at least one processor; and at least one memory including computer program code for one or more programs, the at least one memory and the computer program code configured to, with the at least one processor, cause the apparatus to perform at least the following, determine personal detail information associated with respective users of a plurality of users, a plurality of devices associated with the respective users of the plurality of users or a combination thereof, wherein the determined personal detail information includes user information about the respective users' home locations or neighborhoods and excludes information regarding the respective users' travel history;

determine location data associated with a geographic region and further associated with the respective users of the plurality of users, the plurality of devices associated with the respective users of the plurality of users or a combination thereof, wherein the determined location data includes information about the respective users' travel histories;

process determined first user personal detail information and determined first user location data associated with a first user of the plurality of users, a device associated with the first user or a combination thereof to generate first user reliability information associated with the first user location data for at least a portion of the geographic region, wherein the first user reliability information is generated based on one or more associations, determined by the processing, between the determined first user personal detail information and the determined first user location data;

process determined second user personal detail information and determined second user location data associated with a second user of the plurality of users, a device associated with the second user or a combination thereof to generate second user reliability information associated with the second user location data for the at least the portion of the geographic region, wherein the second reliability information is generated based on one or more determined associations, determined by the processing, between the determined second user personal detail information and the determined second user location data;

compare, for the at least the portion of the geographic region, the first user reliability information and the second user reliability information;

select location data for the at least the portion of the geographic region based on the comparing; and validate or update a record of the at least the portion of the geographic region based on the selected respective location data.

11. An apparatus of claim 10, wherein the apparatus is further caused to:

process the personal detail information to determine at least one geographical area associated with at least one of the respective users of the plurality of users, at least one device associated with the at least one of the respective users or a combination thereof.

12. An apparatus of claim 10, wherein the apparatus is further caused to:

process the personal detail information to determine privacy information associated with at least one of the respective users of the plurality of users, at least one device associated with the at least one of the respective users or a combination thereof.

13. An apparatus of claim 10, wherein the personal detail information includes, at least in part, location data, history data, social data, personal data, behavioral data, reference data, or a combination thereof.

14. An apparatus of claim 13, wherein the apparatus is further caused to:

process the location data, history data, social data, the personal data, the behavioral data, the reference data, or a combination thereof to determine a location data reporting history, demographic information, a contextual history, or a combination thereof.

15. An apparatus of claim 13, wherein the apparatus is further caused to:

process the location data, history data, social data, the personal data, the behavioral data, the reference data, or a combination thereof to determine one or more social connections between a user and one or more other users of the plurality of users.

16. An apparatus of claim 10, wherein the apparatus is further caused to:

process sensor data associated with a user, a user device, or a combination thereof to determine one or more location data candidates; and receive the sensor data as the location data associated with the geographic region from among the one or more location data candidates.

17. An apparatus of claim 16, wherein the apparatus is further caused to:

initiate a presentation of the one or more location data candidates based, at least in part, on determining whether the one or more location data candidates at least substantially meets one or more reporting criteria, wherein the user selection of the location data is from among the presented one or more location data candidates.

18. An apparatus of claim 16, wherein the apparatus is further caused to:

determine one or more location traces based, at least in part, on the sensor data, wherein the location data, the one or more location data candidates, or a combination thereof are based, at least in part, on the one or more location traces.

\* \* \* \* \*